Oct. 13, 1931. H. J. LOVENSTON 1,826,802
SINE BAR FIXTURE
Filed Dec. 31, 1927
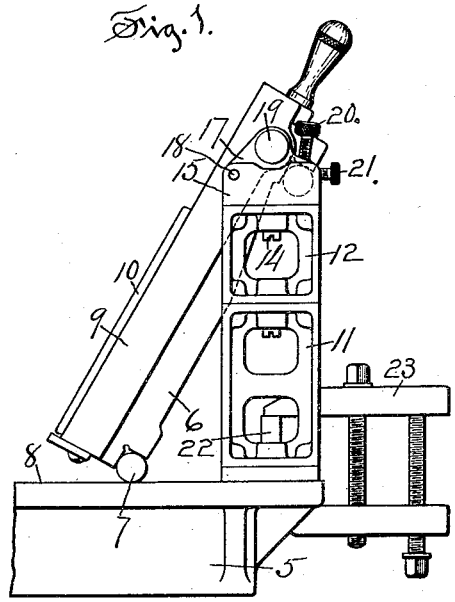
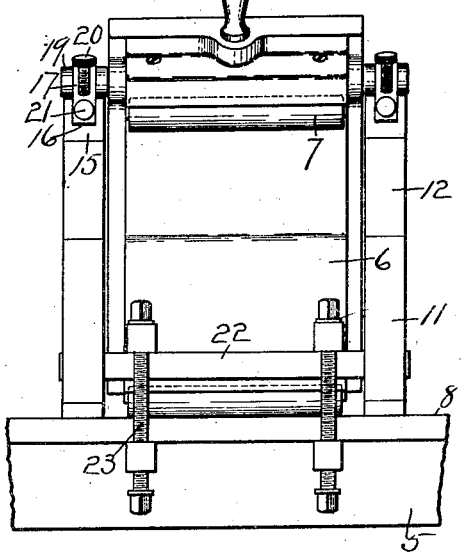
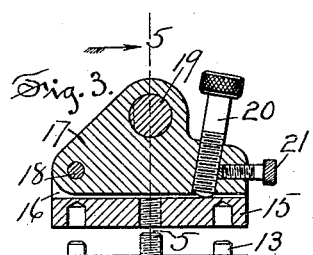
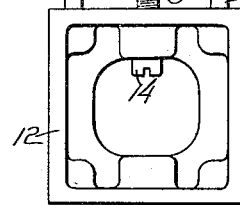
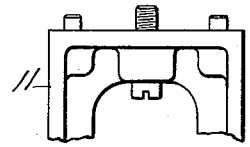
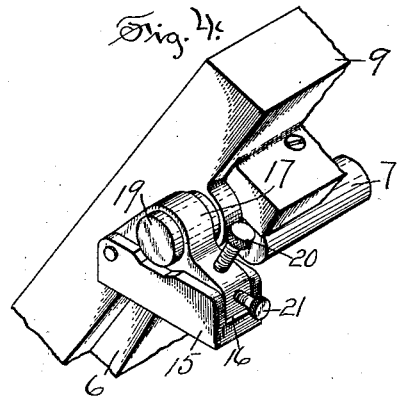
INVENTOR
Hans J. Lovenston
by
Arthur B. Jenkins
ATTORNEY Patented Oct. 13, 1931

1,826,802

UNITED STATES PATENT OFFICE

HANS J. LOVENSTON, OF DETROIT, MICHIGAN

SINE BAR FIXTURE

Application filed December 31, 1927. Serial No. 243,809.

My invention relates to the class of instruments employed for supporting work at certain angles for various operations thereon, usually by machine tools, and an object of my invention, among others, is to provide a sine bar fixture to serve as a support for a sine bar while operations are being performed on work supported thereby, and a further object of the invention is to provide a fixture that may be used in place of gage blocks and that shall have means for determining the angle desired for a sine bar with respect to its support in a simple and efficient manner.

One form of a fixture embodying my invention and in the construction and use of which the objects herein set out, as well as others, may be attained, is illustrated in the accompanying drawings, in which—

Figure 1 is a side view of my improved fixture shown as supporting a sine bar.

Figure 2 is a back view of the same.

Figure 3 is a view, scale enlarged, illustrating the construction of the supporting fixture.

Figure 4 is an isometric view illustrating the manner of attaching the supporting fixture to a sine bar.

Figure 5 is a view on a plane denoted by the dotted line 5—5 of Figure 3.

In the accompanying drawings the numeral 5 indicates a supporting block having a flat level upper surface arranged to support a sine appliance that includes a sine base 6 provided at or near its opposite ends with sine rests 7 which enable the base to be placed upon a surface, as 8, in any angular position and in which gage blocks only have heretofore been employed for determining this position. A surface plate 9 is secured to the sine base 6 and it may have sides 10 as a means for retaining work thereon. All of the parts thus far described are of old and well known construction and except in connection with other devices now to be set forth form no part of my present invention.

Heretofore it has been common practice to employ a set of gage blocks resting on the surface 8 and supporting the sine bar at an angle to said surface by means of the sine rest 7 at the upper end of the sine bar. These gage blocks are very expensive and it therefore becomes important to preserve them by preventing undue wear thereon or marring or other distortion thereof. The sine bar is a comparatively heavy piece, and when work is located thereon this weight is materially increased and this is again increased when pressure is applied to the piece of work by a tool performing an operation upon it.

It is to overcome these objections that I have devised my present sine fixture and which may, in many instances, be made use of in place of the gage blocks heretofore mentioned. In effecting my purpose I provide a set of elevating blocks to rest upon the surface 8 and rise vertically therefrom, as in the case of the gage blocks heretofore used, or when employed in connection with said gage blocks. These elevating blocks 11—12, which actually act as supporting blocks, may be of different thicknesses or heights and they may, if desired, be connected as by means of dowel pins 13 on one piece fitting corresponding sockets in the other piece and these dowel pins may be supplemented by screws 14 if desired. These elevating or supporting blocks are used to obtain approximately the desired height from the surface 8 at which to support the sine bar, this height, as an example, being within one-quarter of an inch or less, of the actual height desired, and the remaining dimension is obtained by the use of an adjusting fixture which will supply any dimension required between the height thus obtained and the point at which it has been determined the sine bar shall rest.

It will be understood that there are two sets of elevating blocks located, one set at each side of the sine bar, and an adjusting fixture is supported on the top of each set of elevating blocks.

Each of these adjusting fixtures comprises a base 15 having a groove 16 in which a pivotally mounted adjusting block 17 is located. This pivot 18 is located in the side parts forming the groove in the base 15. The sine bar has a spindle 19 projecting into opposite side edges thereof and preferably secured against rotation therein and these spindles, when acting to support a sine bar, are projected through holes in the block 17 and they are preferably headed as shown in Fig. 4 of the drawings, said sprindles being freely turnable in said holes and preferably projecting into the sine bar far enough to provide a stable support therefor.

An adjusting screw 20 extends through each adjusting block, the inner end of the screw abutting against the bottom of the groove 16 in the base 15. By means of this screw the adjusting block may be rotated on its pivot, thereby placing its spindle hole in any vertical position that may be desired and within range of the device. A clamping screw 21 may be employed, if desired, to secure the adjusting screw 20 against rotation.

In the use of the device gage blocks, hereinbefore referred to, may be employed to determine the elevation of the sine rest 7 at the upper end of the sine bar, these gage blocks being used in a manner that will be readily understood. When the sine bar has been thus positioned, elevating blocks 11 and 12 may be employed to place the holes in the blocks 17 approximately in position to receive the spindles 19, it being understood, as hereinbefore described, that two sets of these elevating blocks are used. The adjusting screws 20 will then be made use of to accurately position the blocks 17 so that the holes therein will be in position to receive the spindles 19 which then may be entered in the holes without disturbing the position of the sine bar, and when said bar is thus supported by the elevating blocks the gage blocks may be removed, it being noted that the elevating blocks will support the sine bar at the proper angle when the gage blocks may be slid back and forth freely underneath the upper sine rest 7 but in contact therewith.

It will be seen that these elevating blocks may, in some cases, be made use of instead of the gage blocks, but the latter, or their equivalent, will be employed when extreme accuracy is desired. The columns formed by the elevating blocks 11 and 12 may be secured to the base 5 as by means of a holding bar 22 having its ends placed in openings in elevating blocks on opposite sides of the base 5, said bar being held by means of a clamp 23.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:—

1. A sine bar fixture including a main support consisting of a plurality of interconnected stacked blocks, an end fixture including a sine bar support permanently but movably attached to an end block of said main support to support a sine bar at various angles not obtained by means of the main support, and means for adjusting the position of said sine bar support.

2. A sine bar fixture including a main support variable in height, a support pivotally adjustably located on the top of the main support, means on the adjustable support eccentric to its pivot to receive and support a sine bar at various heights, and means for pivotally adjusting the position of said adjustable support.

3. A sine bar fixture including a main support comprising a plurality of separably connected members, a support at the top of said main support and adjustably movable to receive and support a sine bar at various heights, means for adjusting the position of said last-mentioned support, and means for securing said adjusting means in various positions of adjustment.

4. A supporting member for a sine bar fixture, said member including a base, an elongated block pivotally attached adjacent one end to the base and having means intermediate its ends for attachment to a sine bar, and means adjacent the free end of the block for pivotally adjusting the position of said means with respect to first mentioned base.

5. A supporting member for a sine bar fixture, said member including a grooved base, an adjusting block pivotally mounted in the groove in said base and having a hole to receive a spindle projecting into a sine bar and to permit free rotation of said spindle, and means for pivotally adjusting the position of said block.

6. A sine bar fixture comprising a plurality of elevating blocks, a base adapted for support on the top of a column of said blocks, an adjusting block pivotally mounted in a groove in said base, and having a hole to receive a spindle projecting into the side of a sine bar to connect said block to said sine bar and to permit free rotation of the adjusting block and sine bar relatively to each other, and an adjusting screw projecting through said adjusting block and resting against said base to pivot said block.

7. A supporting structure for a sine bar, including a plurality of stacked blocks, means for connecting the blocks, and means including a pivotally mounted block for adjustably supporting a sine bar upon the stack to change the angular position of said bar.

HANS J. LOVENSTON.